US008688396B2

(12) United States Patent
Lin et al.

(10) Patent No.: US 8,688,396 B2
(45) Date of Patent: Apr. 1, 2014

(54) TARGETED DATA COLLECTION FOR POSITIONING SYSTEMS

(75) Inventors: Jyh-Han Lin, Mercer Island, WA (US); Francis X. Dougherty, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 816 days.

(21) Appl. No.: 12/698,416

(22) Filed: Feb. 2, 2010

(65) Prior Publication Data
US 2011/0191052 A1 Aug. 4, 2011

(51) Int. Cl.
*G01C 17/38* (2006.01)
*H04W 24/00* (2009.01)
(52) U.S. Cl.
USPC .......................................... 702/94; 455/456.3
(58) Field of Classification Search
USPC ............... 702/94, 81, 84, 127, 150, 156–157, 702/182–183, 189; 342/357.25, 385–386, 342/450–451, 458; 455/422.1, 423–425, 455/426.2, 456.1–456.6, 457, 461, 463; 705/7.34, 7.38, 7.41
See application file for complete search history.

(56) References Cited

U.S. PATENT DOCUMENTS

| 7,558,808 B2 | 7/2009 | Mason et al. |
| 2008/0228791 A1 | 9/2008 | Wilson et al. |
| 2010/0157823 A1* | 6/2010 | Li et al. ........................ 370/252 |

OTHER PUBLICATIONS

Jiang et al., Preserving Location Privacy in Wireless LANs, Jun. 11-13, 2007, MobiSys '07, 12 pp.*
Krejcar, O., User Localization for Large Artifacts Prebuffering and Safety Possibilities in Mobile Embedded Systems, 2008 IEEE, pp. 41-45.*
Bahl et al., User Location and Tracking in an In-Building Radio Network, Feb. 1999, Microsoft Research, Technical Report, MSR-TR-99-12, 12 pp.*
Trompette, et al., "Crowdsourcing as a Way to Access External Knowledge for Innovation: Control, Incentive and Coordination in Hybrid Forms of Innovation", Retrieved at <<http://halshs.archives-ouvertes.fr/docs/00/36/73/73/PDF/TrompetteChanalPelis-sierEGOS.pdf>>, 2008, pp. 1-29.
"Crowdsourcing: Spec Watch",Retrieved at<<http://crowdsourcinglog.com/>>,Jun. 26, 2009, pp. 1-17.
Firantas, et al., "Location Based Mobile Service", Retrieved at<<http://www.itu.dk/~martynas/LBS/LBS.pdf>>, Aug. 6, 2008, pp. 27.
Chen, et al., "A Crowdsourceable QoE Evaluaiton Framework for Multimedia Content",Retrieved at<<http://mmnet.iis.sinica.edu.tw/pub/chen09_crowdsourcing.pdf>>,Oct. 19-24, 2009, pp. 10.
Thanh, at al., "Personalised Dynmanc IMS client using Widgets", Retrieved at<<http://folk.uio.no/paalee/publications/ims-thanh-gsma-2009.pdf>>,Oct. 7, 2009, pp. 20.

(Continued)

Primary Examiner — Toan Le
(74) Attorney, Agent, or Firm — Bryan Webster; Andrew Sanders; Micky Minhas

(57) ABSTRACT

Selecting devices from which to receive data for adjusting the performance of a positioning system. The positioning system infers the location of the devices based on beacons observed by the devices. The performance of the positioning system is compared to performance targets. One or more of the devices are selected based on the comparison. Data collection from the devices is adjusted to affect performance of the positioning system (e.g., improved or reduced). For example, if the positioning system predicts positions poorly for a particular area, data collection from selected devices within the particular area may be increased.

20 Claims, 6 Drawing Sheets

(56) References Cited

OTHER PUBLICATIONS

Blau, et al., "Remash! Blueprints for RESTful Situational Web Applications", Retrieved at <<http://www.integror.net/mem2009/papers/paper1.pdf>>, Apr. 20-24, 2009, pp. 10.

Unknown, "Navizon: Peer-to-Peer Wireless Positioning," Retrieved at <<http://www.navizon.com/index.asp>>, Nov. 25, 2009, pp. 1.

"First Office Action", Mailed Date: Jun. 3, 2013, Application No. 201110037491.3, pp. 9.

Bahl, et al., "User Location and Tracking in an In-Building Radio Network", Retrieved at <<http://research.microsoft.com/pubs/69694/tr-99-12.pdf>>, Feb. 28, 1999, pp. 11.

\* cited by examiner

TARGETED DATA COLLECTION FOR POSITIONING SYSTEMS

BACKGROUND

Some existing systems such as global positioning systems determine the location of devices using satellites. Other systems such as collaborative systems determine the location of the devices based on crowd-sourced data. The crowd-sourced data includes location data obtained from mobile devices such as laptops, netbooks, and cellular telephones. The quality and frequency of the obtained, crowd-sourced data varies based on, for example, device type, location, network, operating system, and other variables. While some existing systems are able to limit crowd sourcing to certain device types and operating systems, the existing systems have limited ability to control collection of the crowd-sourced data to exclude poor quality data, to minimize the impact of data collection on the devices, and to adjust performance of the positioning system. For example, the user experience on the reporting devices may degrade based on the frequency and quantity of data collection such that battery life, processing time, and storage on the reporting devices may be negatively affected.

SUMMARY

Embodiments of the disclosure enable selectively collecting data based on performance targets for a positioning system. A positioning system collects data from at least one of a plurality of devices. Performance of the positioning system is determined. Performance targets associated with the positioning system are accessed. One or more of the devices are selected based at least on the determined performance and the accessed performance targets. Data collection from the selected devices is adjusted to affect performance of the positioning system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure enable, at least, the selective targeting of devices 202 for data collection based on projected returns for enhancing the performance of a positioning system 106. In some embodiments, at any moment in time or at a regular interval, a subset of the devices 202 is dynamically selected to provide crowd-sourced data. The devices 202 are selected for a predefined period of time, and the data to be collected represents a minimum amount of data to meet performance targets 214 for the positioning system 106. Aspects of the disclosure enable the positioning system 106 to prioritize data collection from devices 202 whose data may improve performance greater than those devices 202 whose data may provide less of a projected return. Additionally, aspects of the disclosure prioritize data collection based on other factors such as location. For example, in underperforming geographical areas, aspects of the disclosure enable the positioning system 106 to increase the collection of data from the devices 202 that are average or under-performing.

Figure 1:
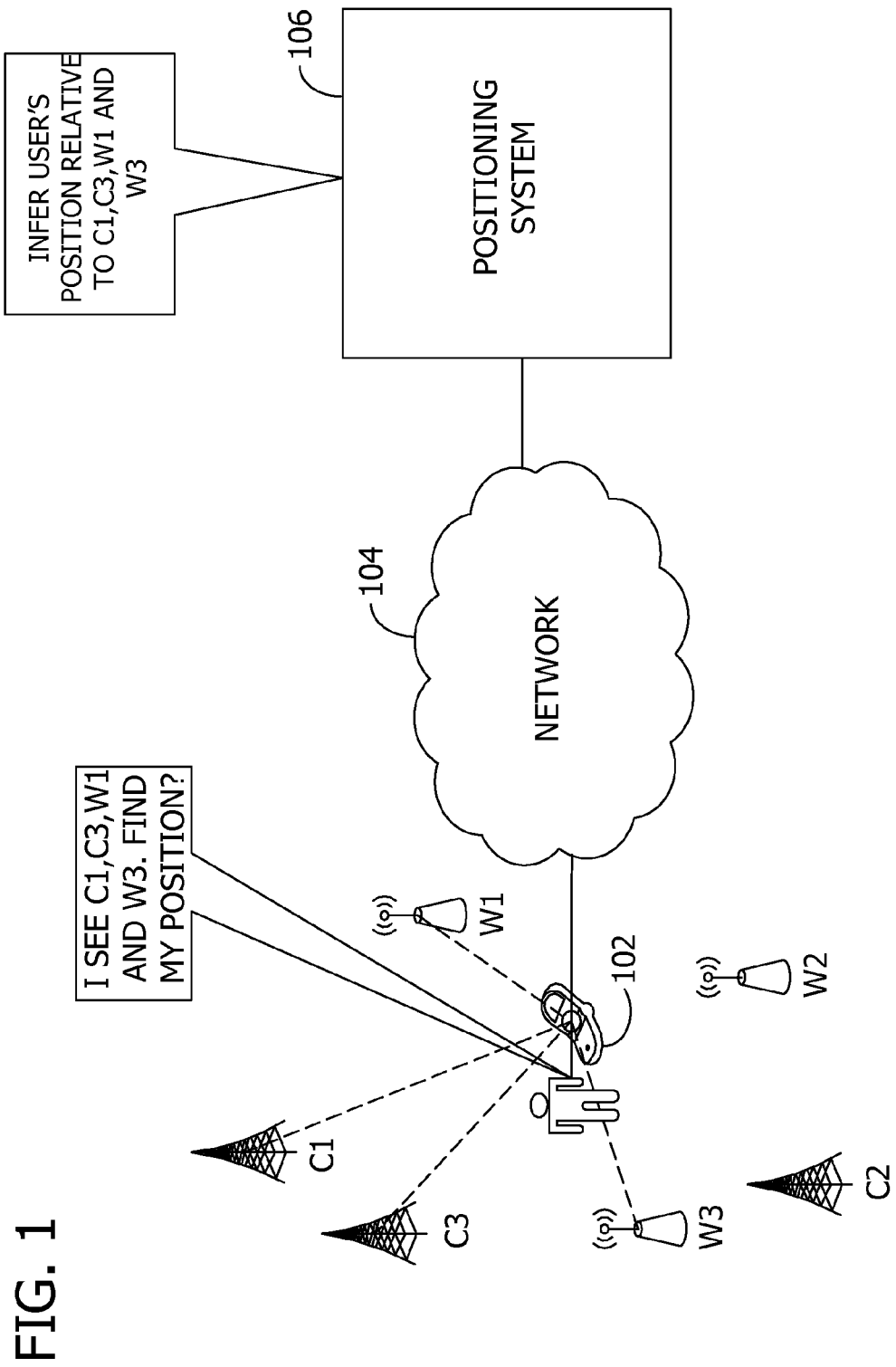
FIG. 1 is an exemplary block diagram illustrating a positioning system inferring a location of a mobile device based on a beacon fingerprint provided by the mobile device.

Referring again to FIG. 1, an exemplary block diagram illustrates the positioning system 106 inferring a location of a mobile device 102 based on a beacon fingerprint provided by the mobile device 102. The mobile device 102 (e.g., a mobile telephone) detects one or more beacons including cellular towers and wireless fidelity (Wi-Fi) access points or other wireless access points (WAPs). The detected beacons represent the beacon fingerprint. While aspects of the disclosure may be described with reference to beacons implementing protocols such as the 802.11 family of protocols, embodiments of the disclosure are operable with any beacon for wireless communication. In the example of FIG. 1, the mobile device 102 detects the presence of beacons C1, C3, W1, and W3.

The mobile device 102 provides the detected beacon fingerprint to the positioning system 106 via a network 104. The network 104 includes a wireless cellular network in some embodiments, but other types of networks such as Wi-Fi and those providing Internet access are contemplated in other embodiments.

The positioning system 106 stores, or has access to, data describing the approximate location of one or more of the beacons. The data is referred to as beacon reference data. The accuracy of the beacon reference data for a particular beacon varies based on the source of the beacon reference data for that particular beacon. For example, for beacon reference data that is derived from crowd-sourced data, the accuracy of the beacon reference data is dependent on the quality of the crowd-sourced data.

Using the approximate location of at least one of the beacons in the detected beacon fingerprint, the positioning system 106 operates to infer the position of the mobile device 102 relative to the detected beacon fingerprint. The inferred position is provided to the mobile device 102.

Figure 2:
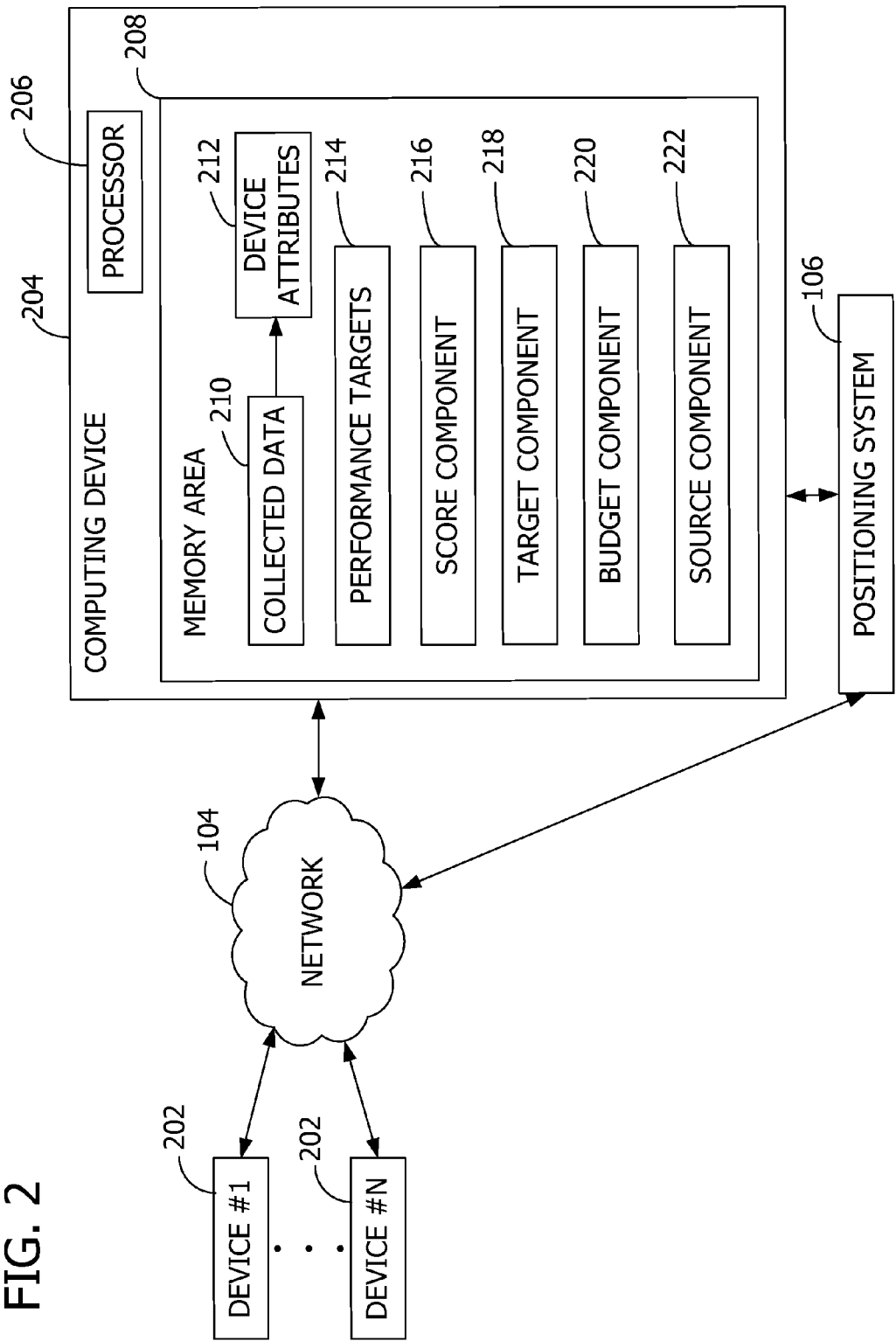
FIG. 2 is an exemplary block diagram illustrating a computing device selectively collecting data based on performance targets for the positioning system.

Referring next to FIG. 2, an exemplary block diagram illustrates a computing device 204 selectively collecting data based on performance targets 214 for the positioning system 106. The computing device 204 collects data from one or more of the devices 202, such as device #1 through device #N, via the network 104. The positioning system 106 communicates with the computing device 204 to infer positions of one or more users upon request based on the collected data 210. The devices 202 include, for example, mobile computing devices such as mobile device 102. However, the devices 202 may include any device executing instructions (e.g., application programs) to provide the data. The data includes beacon reference data or other data used to calculate the beacon reference data. For example, other data may include a description of a landmark, an intersection, a historical description of a position, and more. The devices 202 may provide the data for collection at regular intervals (e.g., with heartbeat messages), upon request, piggybacked on other messages from the devices 202, upon geography changes, or otherwise in accordance with a condition, event, or defined interval.

In some embodiments, the devices 202 include portable computing devices such as laptops, netbooks, gaming devices, and/or portable media players. Further, each of the devices 202 may represent a group of processing units or other computing devices.

Exemplary networks 104 include wired and/or wireless networks, and may represent local area networks or global networks such as the Internet. In embodiments in which the network 104 includes wireless networks, the computing device 204 and the devices 202 may be enabled with technology such as BLUETOOTH brand wireless communication services (secured or unsecured), radio frequency identification (RFID), Wi-Fi such as peer-to-peer Wi-Fi, ZIGBEE brand wireless communication services, near field communication (NFC), and other technologies that enable short-range or long-range wireless communication.

The computing device 204 has at least one processor 206 and one or more computer-readable media such as memory area 208. The processor 206 includes any quantity of processing units, and is programmed to execute computer-executable instructions for implementing aspects of the disclosure. The instructions may be performed by the processor 206 or by multiple processors executing within the computing device 204, or performed by a processor external to the computing device 204 (e.g., by a cloud service). In some embodiments, the processor 206 is programmed to execute instructions such as those illustrated in the figures (e.g., FIG. 3).

The memory area 208 includes any quantity of media associated with or accessible to the computing device 204. The memory area 208 may be internal to the computing device 204 (as shown in FIG. 2), external to the computing device 204 (not shown), or both (not shown).

The memory area 208 stores collected data 210 received from the devices 202, and creates and stores device attributes 212 based on the collected data 210. The device attributes 212 are created for each of the devices 202 from which data was collected. The memory area 208 further stores performance targets 214 that represent goals for the positioning system 106, user experience expectations, or other performance-related criteria. In some embodiments, the performance targets 214 include thresholds for metrics such as positional accuracy, response time, and coverage area.

The memory area 208 further stores one or more computer-executable components for implementing aspects of the disclosure. Exemplary components include a score component 216, a target component 218, a budget component 220, and a source component 222. Operation of the components is discussed below with reference to FIG. 2.

At least a portion of the functionality of the various elements in FIG. 2 is performed by other elements in FIG. 2, or an entity (e.g., processor, web service, server, application program, computing device, etc.) not shown in FIG. 2.

Figure 3:
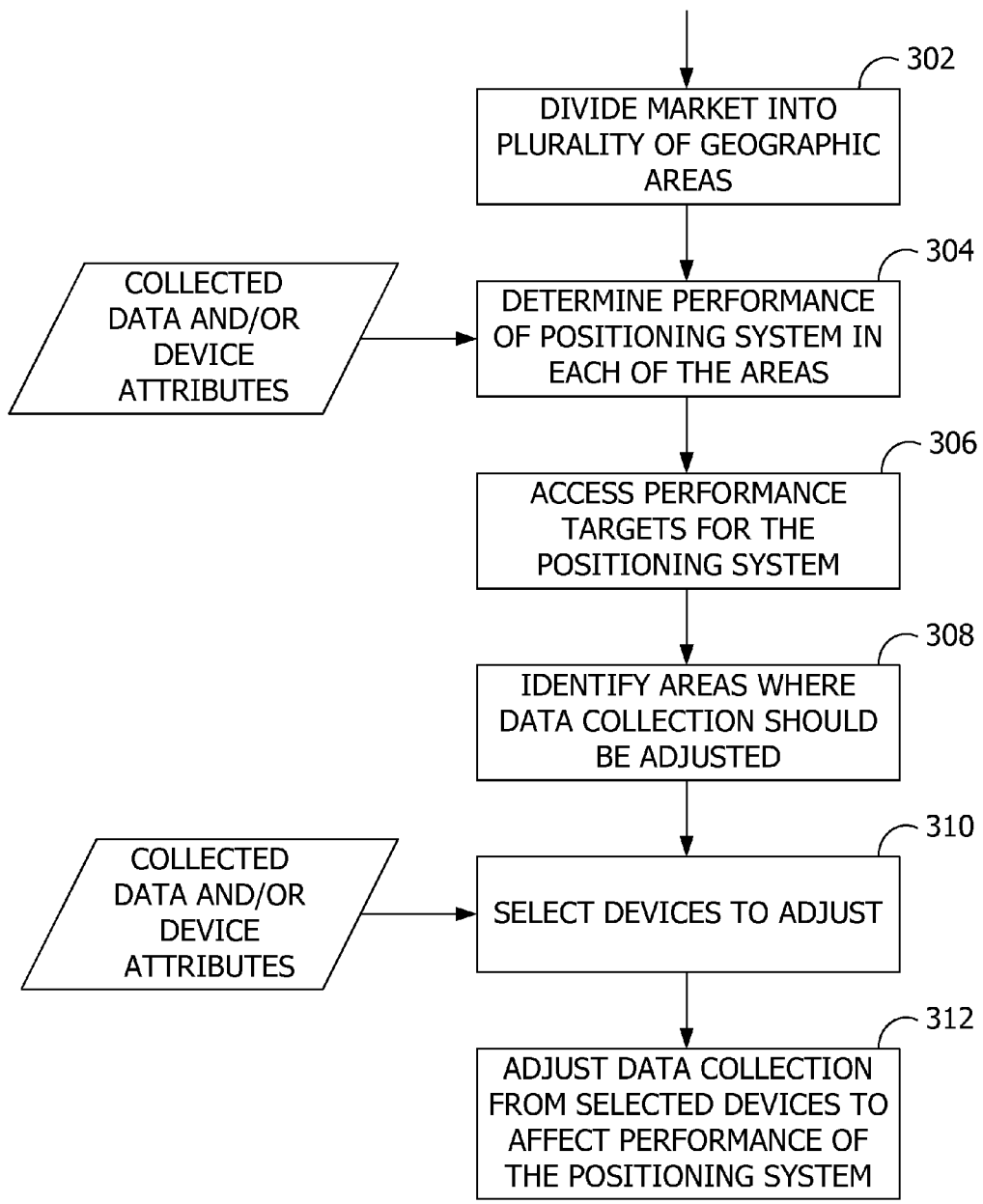
FIG. 3 is an exemplary flow chart illustrating operation of the computing device to adjust data collection from devices based on a comparison between current performance of the positioning system and the performance targets.

Referring next to FIG. 3, an exemplary flow chart illustrates operation of the computing device 204 to adjust data collection from devices 202 based on a comparison between current performance of the positioning system 106 and the performance targets 214. At 302, the market is divided into a plurality of geographic areas. For example, a city or other geographic region is subdivided into a plurality of smaller geographic regions, such as in a two-dimensional grid pattern having a predefined step size. The market may be divided according to any criteria including, for example, terrain, zip code, telephone area code or prefix, population, etc.

At 304, the current performance of the positioning system 106 is determined for each of the plurality of geographic areas. For example, the current performance may be calculated (e.g., a quality score may be calculated) or measured. The current performance is determined based on the collected data 210 and/or device attributes 212. The device attributes 212 represent characteristics of the devices 202. In some embodiments, the device attributes 212 are defined based at least in part on one or more of the following: the collected data 210, user profiles (e.g., users of the devices 202), data inferred from the devices 202, or data inferred from the global positioning system (GPS) trails of the devices 202. For example, the following attributes may be defined: a device capability, quality score, primary geographic area, secondary geographic area, primary operational environment type, secondary operational environment type, and mobility pattern.

At 306, the performance targets 214 for the positioning system 106 are accessed. Accessing the performance targets 214 may include accessing one or more of the following: a query success rate, a time-to-fix value, and a positional accuracy value. In some embodiments, the performance targets 214 are defined by an operator of the positioning system 106. In other embodiments, the performance targets 214 may be set by the users of the devices 202. For example, the performance targets 214 may be set based on feedback from the users or based on a subscription level of the users (e.g., some users pay more for greater accuracy or response time). The performance targets 214 are associated with the market such that different markets may have different performance targets 214. In some embodiments, the performance targets 214 are defined by location, per application, service, user, and/or execution environment (e.g., operating system executing on the devices 202).

At 308, areas within the market where data collection is to be adjusted are identified. In some embodiments, the current performance of the positioning system 106 is compared to the performance targets 214 to identify the areas where data collection is to be adjusted. If the current performance for a particular area does not meet the performance targets 214, differs from the performance targets 214 in excess of a predefined amount, or otherwise performs poorly, the particular area is identified for data collection adjustment. For example, the positioning system 106 may be outperforming (e.g., greater performance) in particular areas while underperforming (e.g., less performance) in other areas. Data collection for the outperforming areas is scaled back, limited, or otherwise reduced while data collection for the underperforming areas is increased.

At 310, the devices 202 for which data collection is to be adjusted are selected. For example, devices 202 within the identified areas are selected based on the collected data 210 and/or device attributes 212. For example, the device attributes 212 may indicate that particular devices 202 have a history of providing poor quality data or have a history of providing high quality data. At 312, data collection from the selected devices 202 is adjusted to affect performance of the positioning system 106. By adjusting the data collection, embodiments of the disclosure operate to reduce the difference between the current performance and the performance targets 214. For example, the quantity of devices 202 from which data is collected may be increased or decreased. In another example, for underperforming areas, data from selected devices 202 with a history of providing poor quality data is refused, rejected, or otherwise not stored. In some embodiments, these selected devices 202 are instructed to no longer provide the data (e.g., blacklisted) or to reduce the frequency of providing the data. Further, the selected devices 202 with a history of providing high quality data are white listed. Alternatively or in addition, for outperforming areas, the selected devices 202 with a history of providing high quality data are adjusted to continue providing the data, but at a reduced frequency (e.g., only collect data when a predicted position is requested by those devices 202).

In some embodiments, the devices 202 are selected at 310 based on a current battery level of the devices 202. In such embodiments, at 312, data collection from the devices 202 with low battery levels is disabled or suspended, for example. Similarly, the devices 202 may be selected based on other resources on the devices 202 such as processor usage, storage capacity, network traffic, and more.

Thus, by execution of the operations at 310 and 312, aspects of the disclosure focus data collection on the devices 202 that provide high quality data. By targeting particular devices 202 to provide the data, embodiments of the disclosure reduce the quantity of devices 202 providing the data, reduce the frequency of data collection, and improve data quality. Further, aspects of the disclosure enable the positioning system 106 to adapt to changes in beacon presence (e.g., addition or removal of cellular towers).

Adjusting the data collection may also include adjusting monetary incentives for participating in data collection. For example, the devices 202 that consistently provide high quality data may be offered a monetary or non-monetary incentive to continue providing such data, or to provide the data at an increased frequency.

In some embodiments, the operations illustrated in FIG. 3 are performed by the computing device 204. In other embodiments, one or more of the operations illustrated in FIG. 3 are performed by another computing device (e.g., as a web service). For example, the operations at 304, 306, and 312 may be performed on each of the devices 202 to enable self-correction.

Further, the operations illustrated in FIG. 3 may be implemented as software instructions encoded on a computer-readable medium, in hardware programmed or designed to perform the operations, or both. As an example, the operations in FIG. 3 may be implemented as computer-executable components or other software such as in the components illustrated in FIG. 2. In such an example, the score component 216, when executed by the processor 206, causes the processor 206 to determine device attributes 212 including one or more of a coverage value (e.g., a query success rate), an accuracy value (e.g., an error radius value where a smaller value indicates greater accuracy), and a response time value (e.g., a time-to-fix value) for each of the devices 202 based on data collected from the devices 202. The target component 218, when executed by the processor 206 causes the processor 206 to access the performance targets 214 associated with the positioning system 106. The budget component 220, when executed by the processor 206 causes the processor 206 to select one or more of the devices 202 based at least on the device attributes 212 determined by the score component 216 and the performance targets 214 accessed by the target component 218. The source component 222, when executed by the processor 206 causes the processor 206 to adjust data collection from the devices 202 selected by the budget component 220 to affect performance of the positioning system 106. For example, the source component 222 adjusts the data collection by targeting the selected devices 202 based on data density (e.g., quantity of beacons within a particular area), geographic area, and/or capabilities of the selected devices 202.

Figure 4:
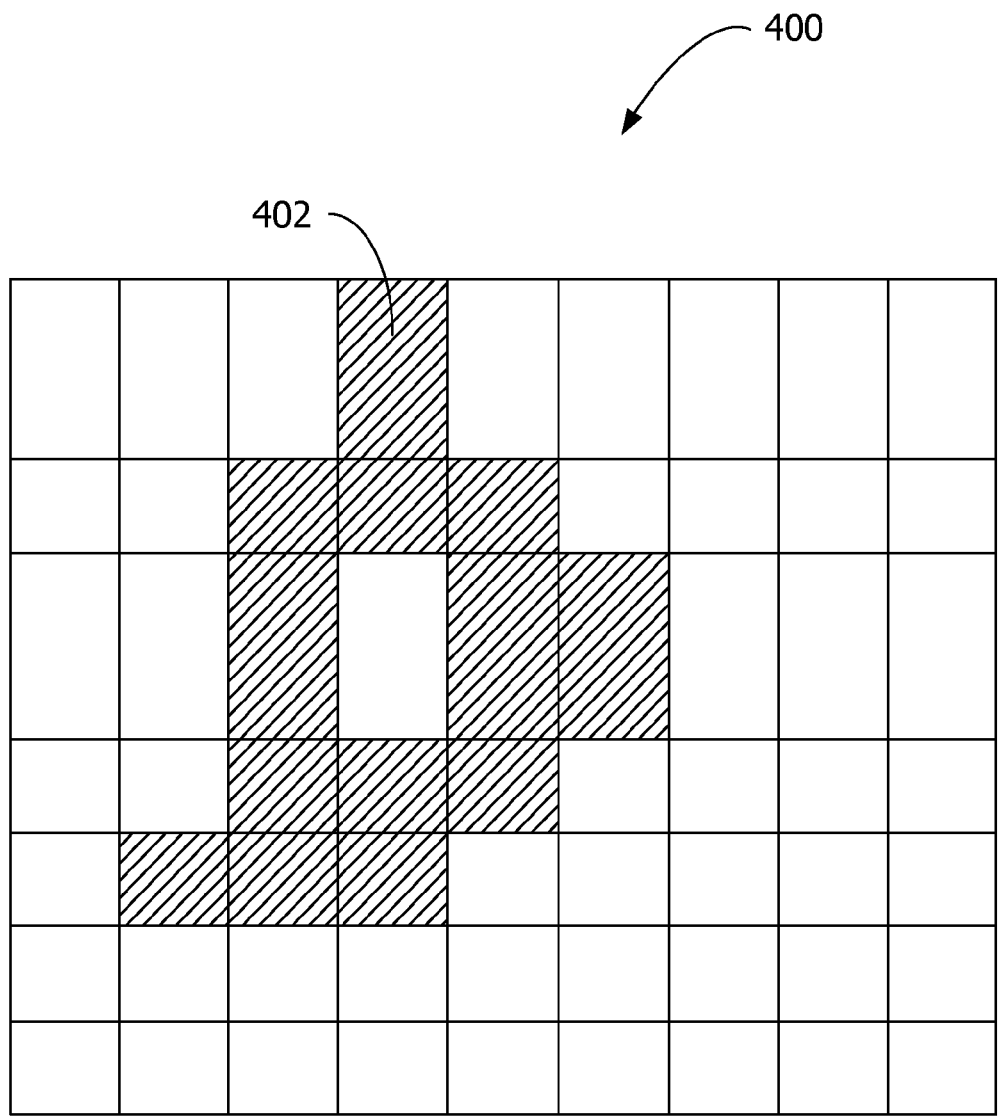
FIG. 4 is an exemplary block diagram illustrating performance of the positioning system in different geographic areas of a market.

Referring next to FIG. 4, an exemplary block diagram illustrates performance of the positioning system 106 in different geographic areas of an exemplary market 400. In the example of FIG. 4, the market 400 has been divided into a grid pattern. Each of the areas within the market 400 has been evaluated in accordance with the operations illustrated in FIG. 3. The result of performance of the operations is that particular areas in the market 400 have been identified for data collection adjustment. In the example of FIG. 4, the areas with the crosshatched patterns such as area 402 represent the areas identified for data collection adjustment.

Figure 5:
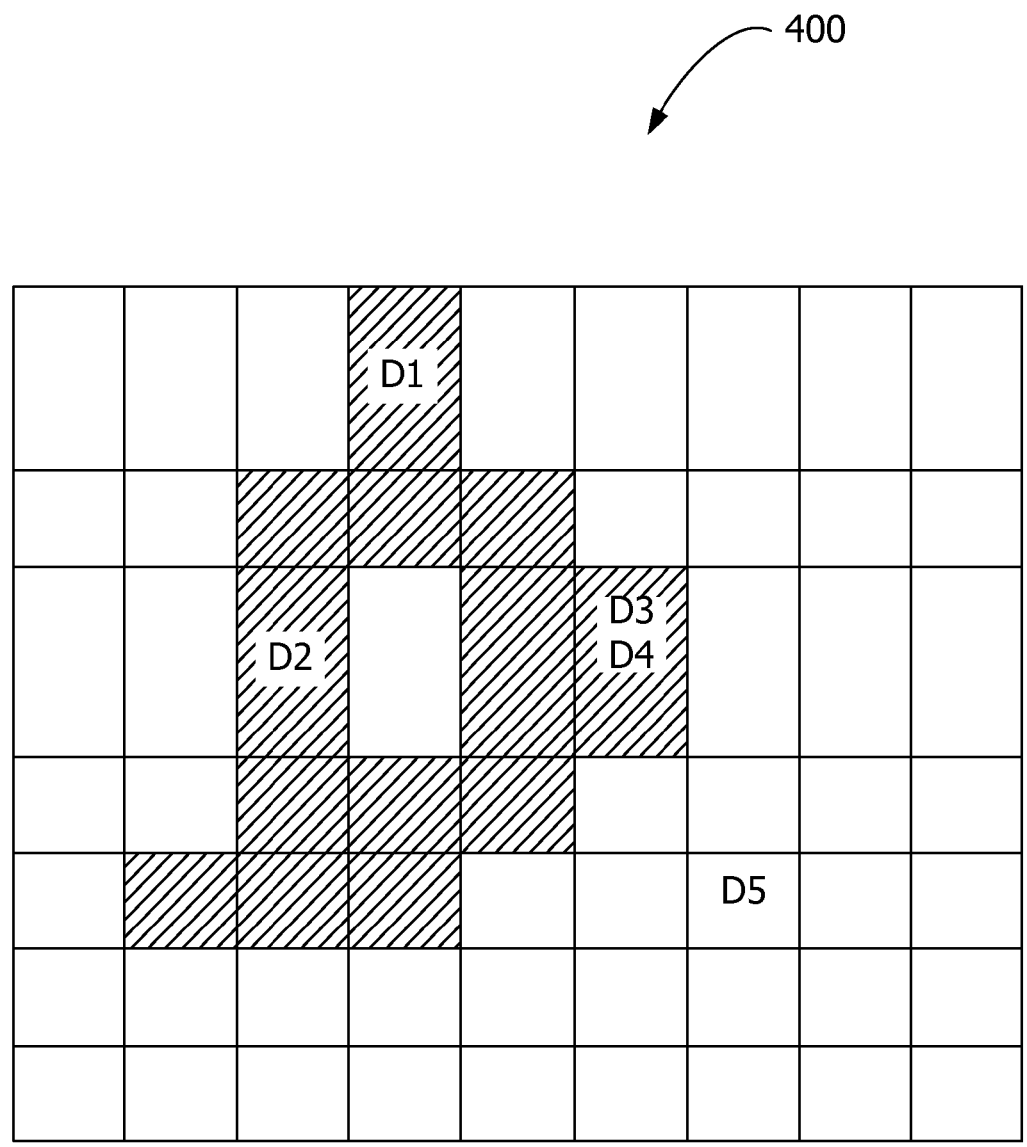
FIG. 5 is an exemplary block diagram illustrating the location of devices within the various geographic areas of the market.

Referring next to FIG. 5, an exemplary block diagram illustrates the location of devices 202 within the various geographic areas of the market 400. To adjust data collection in the identified areas, aspects of the disclosure select devices 202 within the identified areas. In the example of FIG. 5, devices D1, D2, D3, and D4 are selected. Devices D3 and D4 are in the same area, and either or both of these devices may be selected for data collection adjustment. To illustrate the selection process, device D5 is within an area that has not been identified for data collection adjustment and hence will not be selected.

Figure 6:
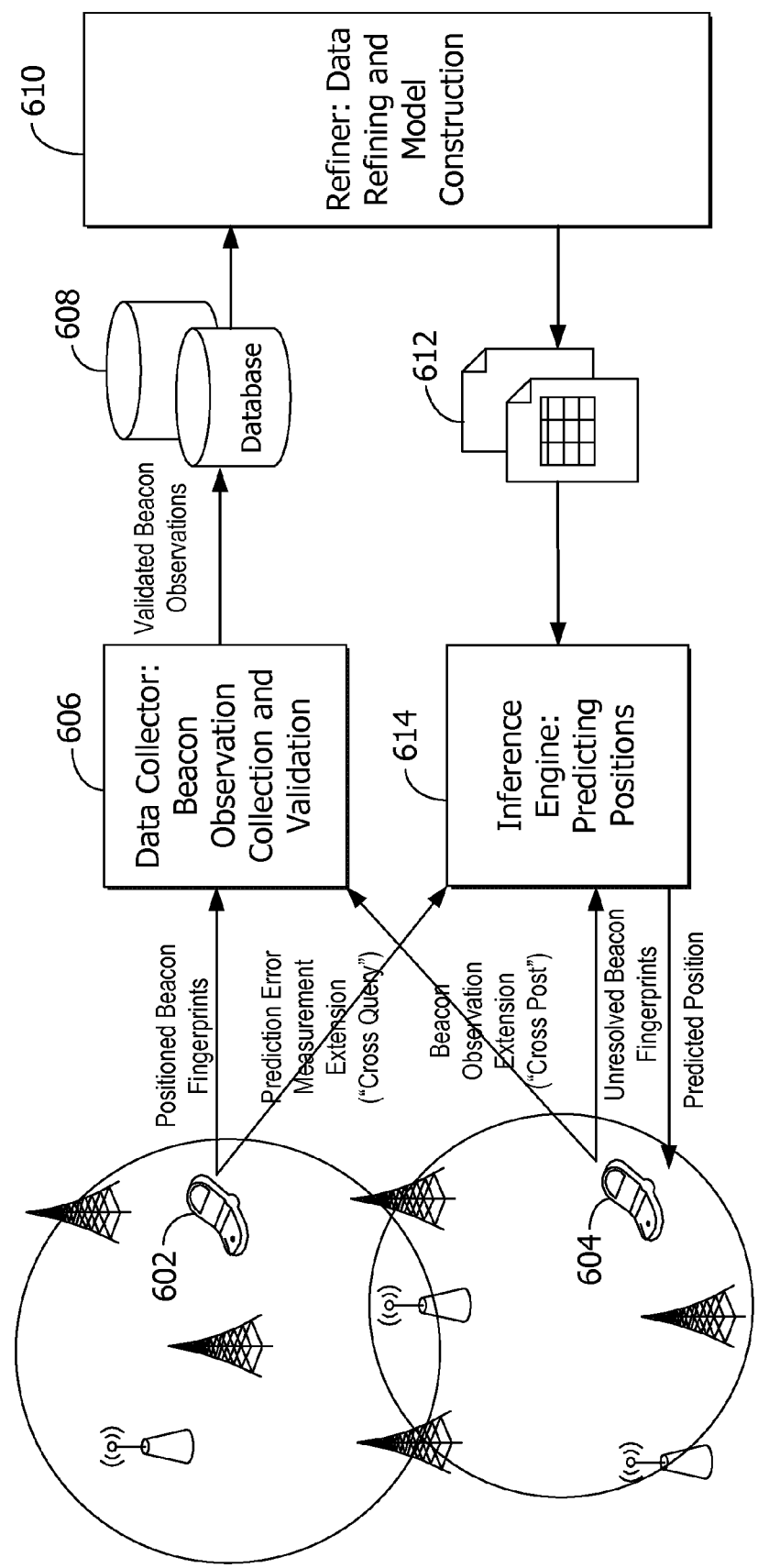
FIG. 6 is an exemplary block diagram illustrating collecting positioned beacon fingerprints to aid in inferring positions for unresolved beacon fingerprints.

Referring next to FIG. 6, an exemplary block diagram illustrates collecting positioned beacon fingerprints to aid in inferring positions for unresolved beacon fingerprints. The system illustrated in FIG. 6 represents an example of a location inference system or positioning system with adjustable data collection in accordance with aspects of the disclosure. However, other systems, elements, and configurations are contemplated and within the scope of embodiments of the disclosure.

A mobile device 602 provides a positioned beacon fingerprint to a data collector 606. The positioned beacon fingerprint (or positioned beacon observation) includes, for example, a beacon fingerprint (e.g., a list of observed beacons) along with associated position information such as from a GPS system. The data collector 606 collects such data from a plurality of devices such as mobile device 602. The data collector 606 also receives unresolved beacon fingerprints (e.g., beacon fingerprints without position information) from devices such as mobile device 604.

The data collector 606 performs validation on the collected data and stores the validated, positioned beacon fingerprints in a database 608. A refiner element 610 performs data refining and model construction on the data stored in database 608 and provides models 612 to an inference engine 614. The inference engine 614 receives the unresolved beacon fingerprints from devices such as the mobile device 604. The inference engine 614 compares the unresolved beacon fingerprints to the models 612 constructed by the refiner element 610 to predict positions associated with the unresolved beacon fingerprints. The predicted position is returned to the devices (e.g., mobile device 604). The inference engine 614 may also compare the positioned beacon fingerprints with the predicted positions to calculate a prediction error measurement for the predicted positions.

Additional Examples

In some embodiments, the positioning system 106 includes a plurality of methods for determining position information.

For example, the positioning system 106 supports assisted GPS, Wi-Fi, and cell identification (Cell ID). The positioning system 106 in these embodiments is able to switch between the methods to provide position information. In an example scenario, a user with a mobile telephone obtains a GPS fix when entering a building and when exiting. While in the building, the mobile telephone continues to collect beacon fingerprints. The position information corresponding to these unresolved beacon fingerprints is inferred from the obtained GPS fixes. In some embodiments, the building layout and location of known WAPs within the building may also be used to make the inferences.

As an example, the score for each area within a market M corresponds to a customer experience function represented by the following tuple or vector with three dimensions $\{f_Q, f_T, f_A\}|M$. The element $f_Q$ represents a query success rate (e.g., coverage) as a percentage. The element $f_T$ represents a time-to-fix (TTF) value (e.g., response time) in milliseconds. The element $f_A$ represents an error radius (e.g., positional accuracy) in meters. An example tuple is {95% success rate, 2-second time-to-fix, 50-meter accuracy}.

The customer experience function may be refined or modified as $\{f_Q, f_T, f_A\}|M, G$ to account for differing geographic environments G such as rural, suburban, dense-urban, and indoor. Further, the customer experience function may be refined or modified as $\{f_Q, f_T, f_A\}|M, G, A$ to account for differing application types A (or service types). This accommodates applications with differing requirements such as "just in time" and "just sufficient accuracy" requirements.

Embodiments of the invention calculate each element of the tuple, compare each calculated element to a performance target, and adjust data collection as described herein. If the tuple is viewed in a three-dimensional space, an improvement in experience corresponds to moving from a lower-positioned point to a higher-positioned point. Given a starting point $P_1$ (with seed data) and a target experience point $P_2$, adjusting the data collection creates a trajectory from point $P_1$ to point $P_2$. There are many possible trajectories between the two points each representing improvements along the different dimensions. For example, one trajectory may improve coverage faster while another may improve accuracy faster.

With regard to the market in FIG. 4, the grid corresponds to a two-dimensional grid of fixed step size (e.g., s meters). The step size of the grid limits the accuracy and resolution of the system. Areas within the grid may be identified using an (x,y) coordinate system. Using the tuple described above, the customer experience function for a particular area at coordinate (x,y) at time t is represented as $\{f_Q(t), f_T(t), f_A(t)\}|M_{x,y}, G, A$.

In some embodiments (not shown), the market may be represented as a three-dimensional grid. Such a representation is useful in environments with differing elevations such as high rises, parking structures (above or below ground), subways, mountain resorts, mines, caves, and the like.

Embodiments of the disclosure may target the devices 202 based on one or more of the following: device identifier, round-robin selection, randomized selection over identified geographic areas, quality of collected data 210 (e.g., higher quality may result in increased data collection), data density (e.g., lower density may result in increased data collection), position query heat map (e.g., more demand may result in increased data collection), model quality (e.g., large error distance or high query failure rate may result in increased data collection), application quality of service agreements (e.g., higher levels may result in increased data collection), and device 202 capability (e.g., assisted GPS performance or indoor positioning performance).

While embodiments have been described with reference to data collected from users, aspects of the disclosure provide notice to the users of the collection of data (e.g., via a dialog box or preference setting) and the opportunity to give or deny consent. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media store information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for selectively collecting the data based on the performance targets 214 for the positioning system 106, and exemplary means for selectively collecting the data based on predicted returns from the collected data 210.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for selectively collecting data based on performance targets for a positioning system, said system comprising:
    a memory area for storing data collected from a plurality of devices; and
    a processor programmed to:
        divide a market area into a plurality of areas;
        determine performance of a positioning system in each of the plurality of areas;
        access performance targets associated with the positioning system, the positioning system determining a position of a requesting device;
        identify one or more of the plurality of areas based at least on a comparison of the determined performance and the accessed performance targets;
        select at least one of the devices in each of the identified areas; and
        adjust data collection from the selected devices to affect performance of the positioning system in the identified areas, the adjusted data collection reducing a difference between the determined performance and the accessed performance targets in the identified areas.

2. The system of claim 1, wherein the processor is programmed to identify the one or more of the plurality of areas by identifying one or more of the plurality of areas having a determined performance less than the accessed performance targets.

3. The system of claim 2, wherein the processor is programmed to adjust the data collection by increasing data collection from the selected devices.

4. The system of claim 1, wherein the processor is programmed to adjust the data collection by reducing a quantity of the selected devices from which the data is collected.

5. The system of claim 1, wherein the processor is programmed to divide the market area by dividing the market area into a two-dimensional grid having a predefined step size, each of the plurality of areas in the market area having different performance targets.

6. The system of claim 1, wherein the memory area stores the collected data including one or more of the following associated with the devices: beacon reference data, cell tower identification, and global positioning system coordinates.

7. The system of claim 1, further comprising means for selectively collecting the data based on the performance targets for the positioning system.

8. The system of claim 1, further comprising means for selectively collecting the data based on predicted returns from the collected data.

9. A method comprising:
    determining, by at least one processor, performance of a positioning system, said positioning system collecting data from at least one of a plurality of devices;
    accessing, by at least one processor, performance targets associated with the positioning system;
    selecting, by at least one processor, one or more of the devices based at least on the determined performance and the accessed performance targets; and
    adjusting, by at least one processor, data collection from the selected devices to affect performance of the positioning system.

10. The method of claim 9, wherein determining the performance of the positioning system comprises defining attributes of the devices, and wherein selecting the one or more devices comprises selecting the one or more devices based on the defined attributes.

11. The method of claim 10, wherein defining attributes of the devices comprises defining one or more of the following: a device capability, quality score, primary geographic area, secondary geographic area, primary operational environment type, secondary operational environment type, and mobility pattern.

12. The method of claim 9, wherein accessing the performance targets comprises accessing one or more of the following: a query success rate, a time-to-fix value, and a positional accuracy value, the performance targets being based on a subscription level of users associated with the plurality of devices.

13. The method of claim 9, wherein determining the performance of the positioning system comprises measuring performance of the positioning system.

14. The method of claim 9, wherein determining the performance of the positioning system comprises calculating a quality score for each of the plurality of devices, and further comprising comparing the calculated quality score for each of the plurality of devices to the performance targets.

15. The method of claim 9, wherein determining the performance comprises determining the performance of the positioning system in each of a plurality of geographic areas, and further comprising identifying one or more of the geographic areas having a determined performance greater than the accessed performance targets, wherein selecting said one or more of the devices comprises selecting one or more of the devices associated with the identified geographic areas, and wherein adjusting the data collection comprises reducing data collection from the selected devices.

16. One or more computer storage media storing computer-executable components, said components comprising:
    a score component that when executed by at least one processor causes the at least one processor to determine device attributes including one or more of a coverage value, an accuracy value, and a response time value for each of a plurality of devices based on data collected from the plurality of devices by a positioning system;
    a target component that when executed by at least one processor causes the at least one processor to access performance targets associated with the positioning system, the positioning system determining a position of a requesting device;

a budget component that when executed by at least one processor causes the at least one processor to select one or more of the devices based at least on the device attributes determined by the score component and the performance targets accessed by the target component; and a source component that when executed by at least one processor causes the at least one processor to adjust data collection from the devices selected by the budget component to affect performance of the positioning system.

17. The computer storage media of claim 16, wherein the score component determines the device attributes including one or more of the following: a query success rate, a time-to-fix value, and a radius value, the score component identifying, based on the determined device attributes, the devices having a history of providing poor quality data or high quality data.

18. The computer storage media of claim 16, wherein the source component adjusts the data collection by targeting the selected devices based on capabilities of the selected devices.

19. The computer storage media of claim 16, wherein the source component adjusts the data collection by targeting the selected devices based on data density.

20. The computer storage media of claim 16, wherein the source component adjusts the data collection by targeting the selected devices based on geographic area.

\* \* \* \* \*